US009060291B2

(12) United States Patent
Liang

(10) Patent No.: US 9,060,291 B2
(45) Date of Patent: *Jun. 16, 2015

(54) METHOD AND APPARATUS FOR MOBILE TERMINAL USER-ORIENTED PRECISE LOCATION-BASED INFORMATION SERVICES

(71) Applicant: GUANGZHOU UCWEB COMPUTER TECHNOLOGY CO., LTD, Guangzhou (CN)

(72) Inventor: Jie Liang, Guangzhou (CN)

(73) Assignee: GUANGZHOU UCWEB COMPUTER TECHNOLOGY CO., LTD, Guangzhou (CN)

( * ) Notice: Subject to any disclaimer, the term of this patent is extended or adjusted under 35 U.S.C. 154(b) by 0 days.

This patent is subject to a terminal disclaimer.

(21) Appl. No.: 14/155,482

(22) Filed: Jan. 15, 2014

(65) Prior Publication Data
US 2014/0226510 A1    Aug. 14, 2014

Related U.S. Application Data

(63) Continuation of application No. 13/822,296, filed as application No. PCT/CN2011/080457 on Sep. 30, 2011, now Pat. No. 8,774,838.

(30) Foreign Application Priority Data

Feb. 15, 2011    (CN) .......................... 2011 1 0038307

(51) Int. Cl.
*G01S 5/02*    (2010.01)
*H04W 24/02*    (2009.01)
*H04W 64/00*    (2009.01)
*H04W 4/02*    (2009.01)
*G01S 5/00*    (2006.01)

(52) U.S. Cl.
CPC .................. *H04W 24/02* (2013.01); *G01S 5/00* (2013.01); *G01S 5/021* (2013.01); *G01S 5/0263* (2013.01); *H04W 4/023* (2013.01); *H04W 64/00* (2013.01); *H04W 4/02* (2013.01)

(58) Field of Classification Search
CPC ....... H04W 4/023; H04W 64/00; H04W 4/02; H04W 24/02; G01S 5/00; G01S 5/021; G01S 5/0263
USPC .............................. 370/252; 455/456.2, 456.3
See application file for complete search history.

(56) References Cited

U.S. PATENT DOCUMENTS

| | | | |
|---|---|---|---|
| 2002/0132626 A1* | 9/2002 | Tsunehara et al. ............. | 455/456 |
| 2003/0065805 A1* | 4/2003 | Barnes, Jr. .................... | 709/231 |
| 2008/0309557 A1* | 12/2008 | Mailaender ................... | 342/463 |
| 2010/0296415 A1* | 11/2010 | Sachs et al. .................... | 370/254 |
| 2011/0170524 A1* | 7/2011 | Arslan et al. ................... | 370/338 |
| 2011/0254978 A1* | 10/2011 | Yamaji ....................... | 348/231.3 |

* cited by examiner

*Primary Examiner* — Dinh P Nguyen
(74) *Attorney, Agent, or Firm* — Anova Law Group, PLLC

(57) ABSTRACT

The present invention provides a precise location-based information service method and apparatus for mobile terminal browser users. The method includes: acquiring at least two types of positioning references based upon a positioning service request from a user; establishing correlation relationships among the positioning references based on the acquired positioning references; and performing integrated positioning and cross-validation on a precise location of the user based on the correlation relationships to determine final positioning service information. This invention can implement precise location-based services (LBS) and precise Point of Interest (POI) push service by analysis and extraction of the user's location information and behavioral data acquired and accumulated with the user's consent. This satisfies the needs of the mobile phone browser user for precise LBS and personalized nearby information service.

18 Claims, 3 Drawing Sheets

METHOD AND APPARATUS FOR MOBILE TERMINAL USER-ORIENTED PRECISE LOCATION-BASED INFORMATION SERVICES

TECHNOLOGY FIELD

The present invention relates to the field of wireless network and, more particularly, to security control methods and apparatus in wireless network.

BACKGROUND

With the progress of society and the development of technology, the scope of the people's activities becomes more and more increasing and uncertain. The mobility and uncertainty take market opportunity as well as challenges to mobile communications, but at the same time provide unlimited business opportunities for developing and expanding the location based services.

This so-called location-based services (LBS), also known as locating services, is to determine the mobile user's actual geographical location via coordination between the mobile terminal and the mobile network, and to provide the appropriate location-based service information for the mobile user. It is a value-added mobile communication and navigation integrated service mode using the user's location information. Geographic Information System (GIS) plays an extremely important role in the technology of processing the "location".

A location service based mobile geographic information system (MGIS) uses a handheld apparatus, for example, a Portable Personal Digital Assistant (PDA) or a mobile phones as the basic hardware platform, and uses micro satellite GPS system and the embedded technology to build the MGIS environment, which can be used to develop particular applications according to characteristics of an industry. There are a variety of optional technologies for discovering a mobile target's location, including solutions based on the network (base station information), solutions based on mobile phones (WIFI information), and solutions based on Global Positioning System (GPS). In general, the positioning accuracy of the position coordinates may be within 800 m for base station information, within 50 m for WIFI information, and even more accurate for the GPS information.

The above solutions for current LBS are separately used for different application scenarios. However, in practical applications, a single base station or WIFI and/or GPS location-based information service solution has the following problems:

Firstly, positioning is not accurate. For the LBS based on telecommunications base stations, the positioning error is relatively large, and the success rate of positioning is relatively low.

Secondly, the location description is not clear. The position's text description is stiff and not humanized for non-graphical (map) application scenes. Traditional mobile phone positioning is based on the base station information, and the accuracy of the base station information is 800 m. If a specific and detailed place name is provided to the user, such as a certain building, and/or a certain residential community, the user may think that it is incorrect. For example, if the user is near the Zhongguancun (a district), and if the location is described as "Hilon Electronics Market" (a building), the user in the "Pacific electronics market" (another building) may think it is incorrect. But if the location is described as "Zhongguancun", the user may feel better. This is, with the positions determined with different accuracies, different scope descriptions should be used. Due to high accuracy of WIFI positioning, it would be more accurate for the specific position. For the base station positioning, the location information corresponding to the accuracy of the base station information should be provided in order to meet the user's positioning needs.

In addition, nearby information lacks specificity. Current nearby POIs (points of interest) searching service only pushes information based on the geographical location distance, but does not analyze the user's interests based on the degree of the attention. Therefore, it is lacking specificity.

Therefore, to improve the precision, friendliness and applicability of user-oriented location information services, a better solution is needed to provide precise location-based information services for mobile terminal users.

SUMMARY OF THE INVENTION

In view of the above problems, the purpose of the present invention is to provide a precise location-based information service method and apparatus for mobile terminal browser users. It acquires more precise terminal positioning information by integrating three types of positioning references by user's mobile terminals, including the base station information, WIFI information, and GPS information, and further combines relevant parameters of the mobile terminal users to provide more accurate and specific location based services for users.

According to one aspect of the present invention, a precise location-based information service method for mobile terminal browser users is provided, comprising:

acquiring at least two types of positioning references based upon a positioning service request from a user;

establishing correlation relationships among the positioning references based on the acquired positioning references; and performing integrated positioning and cross-validation on a precise location of the user based on the correlation relationships to determine final positioning service information.

According to another aspect of the present invention, a precise location-based information service apparatus for mobile terminal browser users is provided, comprising:

a positioning reference acquiring unit configured to acquire at least two types of positioning references based upon a positioning service request from a user;

a correlation establishing unit configured to establish correlation relationships among the positioning references based on the acquired positioning references; and a positioning information determining unit configured to perform integrated positioning and cross-validation on a precise location of the user based on the correlation relationships to determine final positioning service information.

The present invention is a solution derived from the user and used by the user, based on the inherent advantages of the mobile phone browser installed on the mobile phone. With the user's consent, the user's location information and behavioral data can be acquired and accumulated and, by analyzing and validating the acquired data information, precise LBS and precise POI push service can be implemented. This satisfies the needs of the mobile phone browser user for precise LBS and personalized nearby information service.

In order to achieve the above and other related objectives, one or more aspects of the present invention include those features to be described in detail as follows and particularly pointed out in the claims. The following descriptions and accompanying drawings describe in detail certain illustrative aspects of the present invention. However, these aspects only illustrate some of the ways in which the principle of the present invention may be used. In addition, the present invention intends to include all these aspects and their equivalents.

BRIEF DESCRIPTION OF THE DRAWINGS

By referring to the descriptions of the accompanying drawings and the claims, and with a full understanding of the present invention, other objectives and results of the present invention will be clearer and easily understood. In the drawings:

The same label may be used in all drawings to indicate similar or corresponding features or functions.

DETAILED DESCRIPTIONS

Individual embodiments of the present invention will now be described in detail in reference to the accompanying drawings.

With the rapid development of the terminal positioning service technology today, the user can acquire multiple positioning references by mobile terminals, including the base station information, WIFI information, and GPS information. In order to overcome the drawbacks of terminal positioning by using a single positioning reference, and improve from the current technologies, the present invention acquires a more precise terminal positioning information by integrating the three types of positioning references, and further combines relevant parameters of the mobile terminal users to provide more accurate and specific location based services for users.

Figure 1:
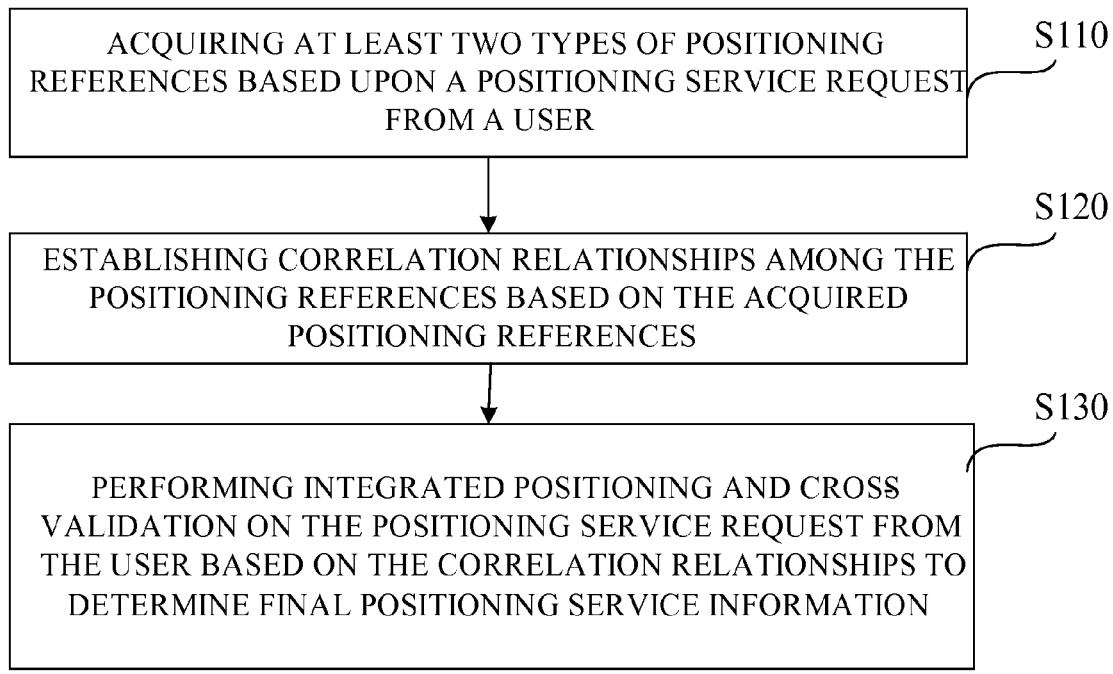
FIG. 1 shows a flow chart of a precise location-based information service method for mobile terminal browser users according to the present invention.

FIG. 1 shows a flow chart of a precise positioning information determination method for mobile terminals according to the present invention. As shown in FIG. 1, at the beginning, in step S110, acquiring at least two types of positioning references based upon a positioning service request from a user; then, establishing correlation relationships among the positioning references based on the acquired positioning references (step S120); in step S130, performing integrated positioning and cross-validation on a positioning service request from a user based on the correlation relationships to determine final positioning service information.

Specifically, as an example, when the user submits a positioning service request through the mobile terminal, the browser on the mobile terminal may simultaneously acquire multiple positioning references, including multiple base station information (position coordinates with the accuracy of within 800 m) references, multiple WIFI information (position coordinates with the accuracy of within 50 m) references, and GPS (accurate position coordinates). Further, correlation relationships can be established among the three types of positioning references based on the positioning information acquired simultaneously. At the same time, adjacent relationships can also be established among the positioning data of multiple users based on same base station information and neighboring WIFI information. Thus, integrated positioning and cross-validation of the positioning information can be achieved.

It should be noted that, among multiple positioning references acquired from mobile terminal browser, base station positioning information is in general included. However, to implement error correction or cross-validation, at least one of the other two types of positioning references need to be acquired.

Because the three types of positioning references are acquired at the same time, the above correlation relationships refer to the fact that the three types of positioning references should represent the same position, i.e., the current location of the mobile terminal user. The so-called accuracy is the accuracy range calculated from the current location of the mobile terminal user. Thus, error correction can be performed among different types of positioning references. Specifically, for example, if the base station information and GPS information of the user can be acquired simultaneously, actual position coordinates of the user should be recorded by GPS information. The position coordinates represented by base station information is the mobile base station's location received from the current location of the user. Due to the limitation of the accuracy of base station information, there is a deviation between the location of the base station and the current location of the user. The position coordinates represented by the base station information might not be the current actual location of the user. In such case, to make base station information closer to the actual location of the user, continuous error correction may be needed when acquiring the positioning references simultaneously. The detailed correction method is set forth in the descriptions below.

In addition, it should be noted that, in the description of the present invention, the adjacent relationship is not the same as the correlation relationship. The adjacent relationship means a relationship where two base stations or two WIFI access points are adjacent or nearby with each other. The three types of positioning references of the user are acquired via the mobile terminal. However, for a certain type of positioning reference, the number of positioning references acquired may be more than one at a time. For example, two base station information positioning references may be acquired at a time. That is, from the current location the user may receive signals from two base stations simultaneously. In this case, it can be determined that the two base stations are adjacent. WIFI signals can be treated similarly. Thus, if the position coordinates from one base station are already corrected and are accurate, when the location of the other base station exceeds the preset adjacent range or is unknown, it can be corrected or set based on the adjacent relationship.

According to various embodiments of the present invention, integrated positioning implementation may include:

1. When multiple positioning references are acquired simultaneously, determining the user's location using a positioning reference with the highest accuracy. The positioning reference with the highest accuracy is the positioning reference with the highest accuracy among the multiple positioning references acquired simultaneously, which may or may not be the GPS information. For example, when base station information and WIFI information are acquired simultaneously, the positioning reference with the highest accuracy is WIFI information.

2. When multiple base stations information or WIFI information are acquired simultaneously without acquiring any GPS information, a multi-point positioning may be performed. Multi-point positioning basically uses a center point of multiple position coordinates. For example, if the user simultaneously acquires information from two base stations, the two base stations represent two position coordinates, and the center point may be a midpoint of these two position coordinates. WIFI signals can be treated similarly. However, WIFI information may be acquired from multiple hot spots simultaneously, and the accuracy of the center point calculation may be relatively more accurate.

The positioning cross-validation or error correction includes:

1. Correcting Base Station Coordinates Using the GPS Information and the WIFI Information By accumulating associated WIFI information and GPS information, errors of base station coordinates can be corrected. It can be understood that, by accumulating information from the same base station while acquiring simultaneously different WIFI information and GPS information, an activity area of most users can be acquired, and the positioning coordinate information of the base station can be modified and the coverage area of the base station can be narrowed.

Figure 2:
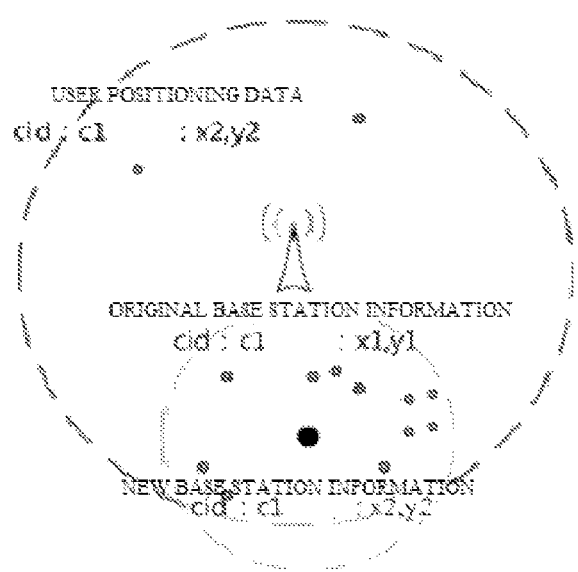
FIG. 2 shows a schematic diagram of correcting base station coordinates using the GPS information and the WIFI information.

FIG. 2 shows a schematic diagram of correcting base station coordinates using the GPS information and the WIFI information. Both GPS information and WIFI information represent location information with high accuracy and can be used to correct positioning errors. All the points in FIG. 2 represent the user's relatively accurate locations, which may be located from GPS information or WIFI information. Further, all the points in FIG. 2 can acquire the same base station information. In this case, the error correction can be performed as follows: within the coverage area of the same base station, there is always a region that the user often visits, such as a university, a commercial center, a residential community, and so on, that is, the user acquired the base station information may substantially appear in that region. Within the coverage area of base station, the region that the user often appears can be determined using the GPS and the WIFI information. Further, the center point of region can be calculated and considered as the position coordinates of the base station positioning. Thus, if the user only uses the positioning reference of the base station information to determine the position, his location information is relatively more accurate. As shown in FIG. 2, according to the user's positioning information (coordinates: x2, y2), the original base station information (coordinates: x1, y1) is corrected as the new base station information (coordinates: x2, y2).

2. Correcting the WIFI Information Using GPS Coordinates Information

The accuracy range of WIFI information is within 50 m. When WIFI information and GPS information are acquired simultaneously, it can be considered that WIFI information is located within the scope of 50 m~100 m of the GPS coordinate. If the distance between the original coordinates of WIFI information and GPS coordinates exceeds the range (e.g., more than 100 m), it may be considered that the WIFI equipment may be moved, and the original coordinates can be replaced with new coordinates based on the GPS coordinates.

3. Correcting the WIFI Information Based on WIFI Adjacent Relationships

The adjacent relationship is established by acquiring simultaneously WIFI information among WIFI equipment. WIFI coordinates can be acquired and corrected by the adjacent relationship if necessary.

In addition, according to the present invention, a mechanism is also introduced for the user to correct positioning description information.

For location descriptions of a region, it is not necessary that the description with the highest accuracy can always be accepted by the user. By introducing a user correction mechanism, the user can input the user's most reasonable information description for a particular position. After a certain period of accumulation, by appropriate screening and elimination of the information descriptions of the locations, location description information with the highest degree of acceptance can be acquired.

Figure 3:
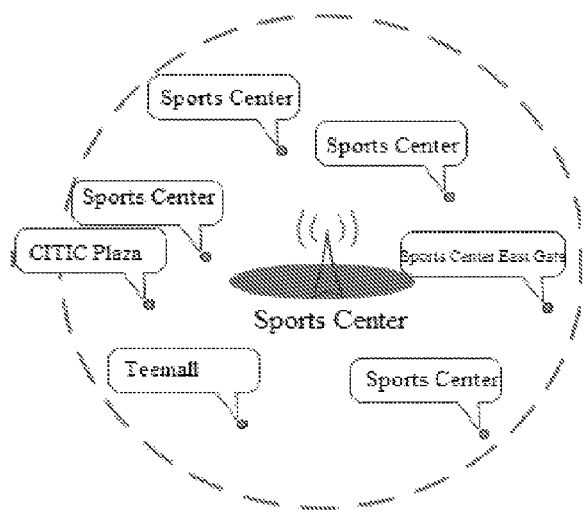
FIG. 3 shows a schematic diagram of correcting the location description information by the user according to embodiments of the present invention.

FIG. 3 shows a schematic diagram of correcting the position description information by the user according to embodiments of the present invention. As shown in FIG. 3, a user assisted error correction scenario is illustrated. Because base station positioning has a low accuracy, within the coverage area of a base station, there may be a plurality of landmark buildings. For example, the area near Guangzhou Sports Center in FIG. 3, within the coverage area of the same base station, there are many landmark buildings including Guangzhou Sports Center, Teemall, CITIC Plaza, etc. The user can search the same base station near any one of these buildings. However, because Guangzhou Sports Center has the largest space compared to any other nearby landmark buildings. "Sports Center" is an acceptable locations description, and then we can use an elimination mechanism during a time period. According to the elimination mechanism, a user may input description information (place name) for current position, or choose one place name (vote) inputted by other users. During the time period, we consider the place name with the most votes as the base station's location description. This mechanism solves the accurate description problem by the agreement on place names from a large number of users.

Further, in the process where the user uses the location information service according to the present invention, the information provided by the user may be used to user behavior accumulation and analysis. Based on the analysis results, the user's interest may be determined, and the user's nearby information may be further pushed to the user. According to the present invention, the user related behavioral parameters may include, but not limited to, gender, age, mobile phone models, and key interest, etc. It is a high level experience of location-based services, which may be achieved after the browser and positioning service are well integrated.

The above describes a precise positioning information determination method for mobile terminals according to the present invention with references to FIGS. 1-3. The above described precise positioning information determination method for mobile terminals can be implemented using software, hardware, or a combination of software and hardware.

Figure 4:
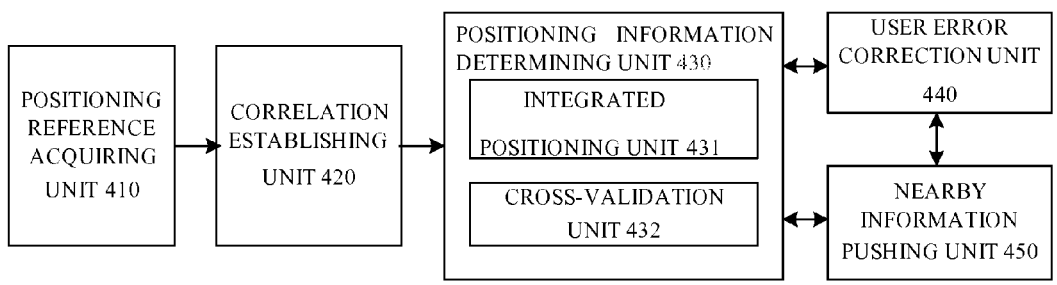
FIG. 4 shows a block diagram of a precise location-based information service apparatus for mobile terminal browser users according to the present invention.

FIG. 4 shows a block diagram of a precise location-based information service apparatus for mobile terminal browser users according to the present invention. As shown in FIG. 4, according to the present invention, a precise location-based information service apparatus for mobile terminal browser users includes a positioning reference acquiring unit 410, a correlation establishing unit 420, and a positioning information determining unit 430.

The positioning reference acquiring unit 410 is configured to acquire multiple positioning references based upon the positioning service request from the user. The correlation establishing unit 420 is configured to establish correlation relationships among the positioning references based on the acquired positioning references from the positioning reference acquiring unit 410.

The positioning information determining unit 430 is configured to perform integrated positioning and cross-validation on a precise location of the user based on the correlation relationships from the correlation establishing unit 420, and to determine final positioning service information.

Further, the positioning information determining unit 430 includes an integrated positioning unit 431 and a cross-validation unit 432.

The integrated positioning unit 431 is configured to determine the precise location of the user by using a positioning reference with the highest accuracy when the at least two types of positioning references are acquired simultaneously, and to perform multi-point positioning when multiple base stations information or WIFI information is acquired simultaneously.

The cross-validation unit 432 is configured to correct base station coordinates using the GPS information and the WIFI information, to correct the WIFI information using GPS coordinates information, and to correct the WIFI information based on WIFI adjacent relationships.

Further, a precise location-based information service apparatus for mobile terminal browser users includes a user error correction unit 440 and a nearby information pushing unit 450. The user error correction unit 440 is configured to accept error correction of the final positioning service information from the user. The nearby information pushing unit 450 is configured to analyze user behavior based on the user's behavior parameters and to push nearby information of interests.

Figure 5:
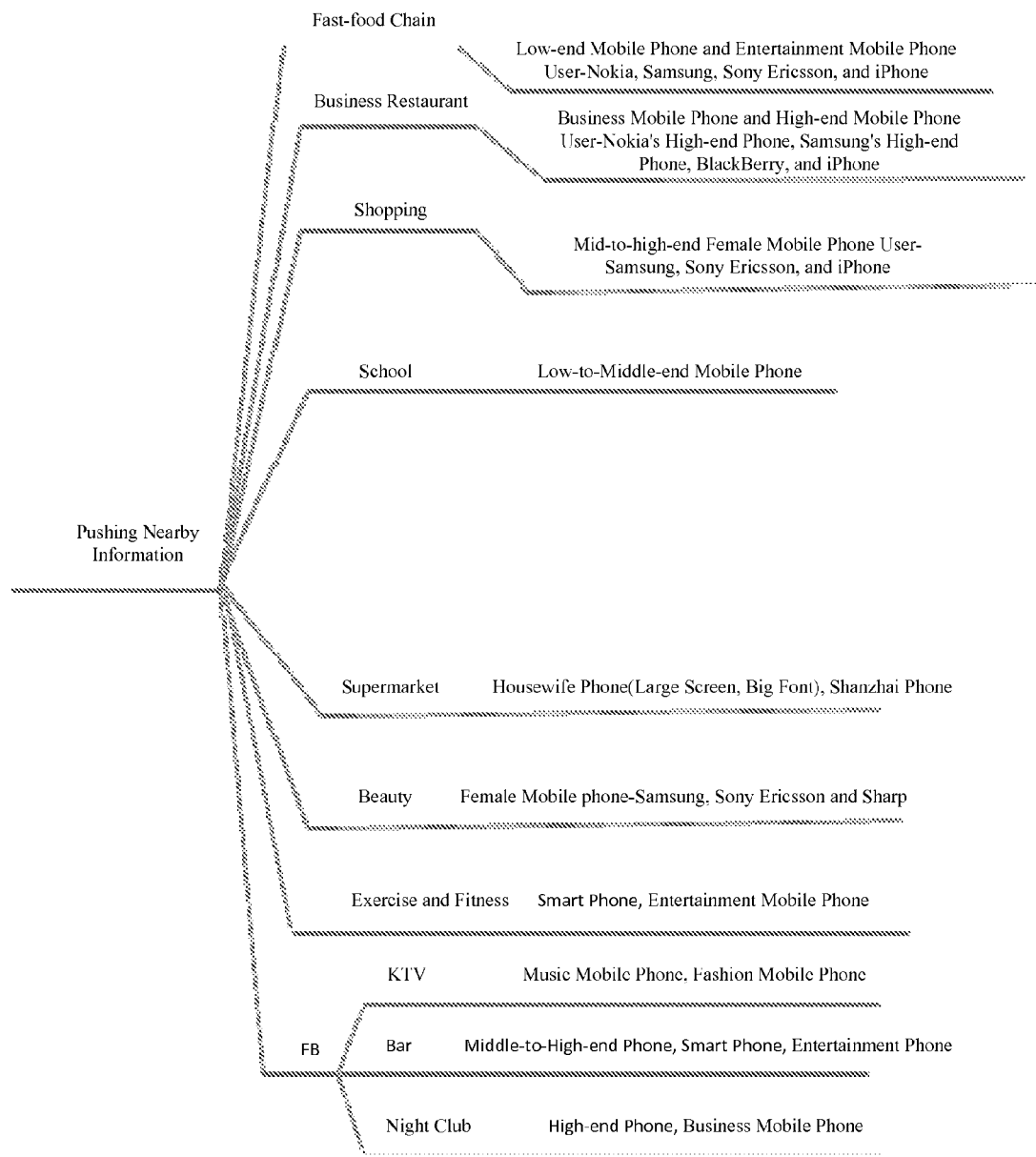
FIG. 5 shows a schematic diagram of a precise nearby information pushing method based on mobile phone models according to embodiments of the present invention.

FIG. 5 shows a schematic diagram of a precise nearby information pushing method based on mobile phone models according to embodiments of the present invention. The rough user populations are determined by mobile phone models. Then, POIs of specific populations are speculated by combining the user's location-based service request information with mobile phone models, etc. Thus, the specific nearby service information may be pushed to specific populations. For example, as shown in FIG. 5, nearby fast-food chain information push should be specific to low-end and middle-end mobile phone users and entertainment mobile phone users, whose phone models' brands include Nokia, Samsung, Sony Ericsson and iPhone; nearby business restaurant information push should be specific to business mobile phone users and high-end mobile phone users, whose phone models' brands include Nokia's high-end phone, Samsung's high-end phone, BlackBerry and iPhone.

In addition, the method of the present invention can also be realized in computer programs executed by the CPU. When the computer programs are executed by the CPU, the above described functionalities defined in the method of the present invention can be performed.

In addition, the above method steps and system units can be realized by a controller or processor, and a computer-readable storage medium storing computer programs capable of making the controller or processor to realize the above method steps or system units.

In addition, it should be clear that the described computer-readable storage media (e.g., memory) may be volatile memory or non-volatile memory, or may include volatile memory and nonvolatile memory. As a non-limiting example, nonvolatile memory can include read-only memory (ROM), programmable ROM (PROM), erasable programmable ROM (EPROM), electrically erasable programmable ROM (EEPROM), or flash memory. Volatile memory may include random-access memory (RAM) and the RAM may be used as external cache memory. As a non-limiting example, RAM can be produced in various forms such as synchronous RAM (SRAM), dynamic RAM (DRAM), synchronous DRAM (SDRAM), double data rate SDRAM (DDR SDRAM), enhanced SDRAM (ESDRAM), synchronous link DRAM (SLDRAM), and direct Rambus RAM (DRRAM). It is intended that the disclosed storage media include but not limited to these and other suitable types of memory.

Those skilled in the art understand that the disclosed various exemplary logic blocks, modules, circuits and algorithm steps can be implemented in electronic hardware, computer software or a combination thereof. In order to clearly illustrate the interchangeability between the hardware and software, the functions of the various exemplary components, blocks, modules, circuits and algorithm steps have been generally described. Whether the functions are implemented in hardware or software depends on the specific application and the design limitation imposed on the entire system. Those skilled in the art can use a variety of ways to realize the described functionalities for each specific application. However, such realization decision should not be interpreted as departing from the scope of the present invention.

The various illustrative logic blocks, modules, and circuits described herein can be designed using the following components performing the disclosed functionalities: general-purpose processor, digital signal processor (DSP), application specific integrated circuits (ASICs), field programmable gate array (FPGA) or other programmable logic device, discrete gate or transistor logic, discrete hardware components, or any combination of these components. The general-purpose processor can be a microprocessor or, alternatively, the processor can be any conventional processor, controller, microcontroller or state machine. The processor can also be a combination of computing devices, such as a combination of DSP and microprocessors, multiple microprocessors, one or more microprocessors integrated with a DSP core, or any other such configurations.

The disclosed methods or algorithm steps may be embodied in hardware directly, in software modules executed by the processor, or in a combination of both. The software modules can reside in RAM memory, flash memory, ROM memory, EPROM memory, EEPROM memory, registers, hard disk, removable disk, the CD-ROM, or any other form of storage medium known in the field. The storage medium can be coupled to the processor, such that the processor can read information from the storage medium and write information to the storage medium. Alternatively, the storage medium can be integrated with the processor. The processor and the storage medium may reside in an ASIC. The ASIC can reside in the user terminal. Also alternatively, the processor and the storage medium may reside as discrete components in the user terminal.

Although the present invention has been disclosed together with the preferred embodiments which is shown and described in detail, those skilled in the art understand that various improvements can be made to the above described precise location-based information service methods and apparatus for mobile terminal users, without departing from the contents of the present invention. Therefore, the scope of the present invention should be defined by the attached claims.

The invention claimed is:

1. A method for providing a precise location-based information service for a user of a mobile terminal browser, including:
acquiring at least two types of positioning references based upon a positioning service request from a user, the positioning references including Wireless Fidelity (WIFI) information and Global Positioning System (GPS) information, the WIFI information indicating coordinates of a WIFI access point providing services to the mobile terminal, the coordinates of the WIFI access point being used as positioning information of the mobile terminal;

establishing correlation relationships among the positioning references based on the acquired positioning references; and performing integrated positioning and cross-validation on a precise location of the user based on the correlation relationships among the positioning references to determine final positioning service information, wherein the cross-validation further includes:

when a distance between coordinates of the WIFI information and coordinates of the GPS information exceeds an accuracy range of the WIFI information, replacing coordinates of the WIFI information with new coordinates based on the GPS coordinates;

wherein:

the positioning references further include base station information, the base station information indicating coordinates of a base station in a mobile phone network providing services to the mobile terminal, the coordinates of the base station being used as positioning information of the mobile terminal; and performing integrated positioning further includes:

when the at least two types of positioning references are acquired simultaneously, determining the precise location of the user by using:

the GPS information, when the acquired at least two types of positioning references include the GPS information; or the WIFI information, when the acquired at least two types of positioning references do not include the GPS information; and when multiple base stations information or WIFI information is acquired simultaneously, using a center point of multiple position coordinates of the multiple base stations information as the base station information, or using a center point of multiple position coordinates of the multiple WIFI information as the WIFI information.

2. The method according to claim 1, wherein the method further includes:

when the distance between coordinates of the WIFI information and coordinates of the GPS information exceeds about 100 meters, replacing coordinates of the WIFI information with new coordinates based on the GPS coordinates.

3. The method according to claim 1, wherein adjacent relationships are established based on same base station information and neighboring WIFI information, and performing cross-validation further includes: correcting the WIFI information based on WIFI adjacent relationships.

4. The method according to claim 3, wherein, after determining the final positioning service information, the method further includes:

accepting error correction of the final positioning service information from the user.

5. The method according to claim 3, wherein, after determining the final positioning service information, the method further includes:

based on the user's mobile phone model, pushing information of a nearby business entity.

6. A method for providing a precise location-based information service for a user of a mobile terminal, including:

acquiring at least two types of positioning references based upon a positioning service request from the user, the positioning reference including Wireless Fidelity (WIFI) information and Global Positioning System (GPS) information, the WIFI information indicating coordinates of a WIFI access point providing services to the mobile terminal, the coordinates of the WIFI access point being used as positioning information of the mobile terminal;

establishing correlation relationships among the positioning references based on the acquired positioning references; and performing integrated positioning and cross-validation on a precise location of the user based on the correlation relationships to determine final positioning service information, wherein performing cross-validation further includes:

when a distance between coordinates of the WIFI information and coordinates of the GPS information exceeds an accuracy range of the WIFI information, replacing coordinates of the WIFI information with new coordinates based on the GPS coordinates;

wherein the positioning references further include base station information, the base station information indicating coordinates of a base station in a mobile phone network providing services to the mobile terminal, and the coordinates of the base station being used as positioning information of the mobile terminal;

wherein performing integrated positioning further includes:

when the at least two types of positioning references are acquired simultaneously, determining the precise location of the user by using:

the GPS information, when the acquired at least two types of positioning references include the GPS information; or the WIFI information, when the acquired at least two types of positioning references do not include the GPS information; and when multiple base stations information or WIFI information is acquired simultaneously, using a center point of multiple position coordinates of the multiple base stations information as the base station information, or using a center point of multiple position coordinates of the multiple WIFI information as the WIFI information.

7. The method according to claim 6, wherein the method positioning further includes:

when the distance between coordinates of the WIFI information and coordinates of the GPS information exceeds about 100 meters, replacing coordinates of the WIFI information with new coordinates based on the GPS coordinates.

8. The method according to claim 7, wherein:

adjacent relationships are established based on same base station information and neighboring WIFI information.

9. The method according to claim 8, wherein performing cross-validation further includes:

correcting the WIFI information based on WIFI adjacent relationships.

10. The method according to claim 8, wherein, after determining the final positioning service information, the method further includes: accepting error correction of the final positioning service information from the user.

11. The method according to claim 8, wherein, after determining the final positioning service information, the method further includes: based on the user's behavioral parameters including a mobile phone model, pushing information of a nearby business entity.

12. The method according to claim 11, wherein the user's behavioral parameters further include: the user's gender, age, and key interest.

13. A mobile terminal, comprising a processor and a memory having computer programs thereon, wherein the computer programs cause the mobile terminal to perform a method for providing a precise location-based information service for a user of a mobile terminal browser, the method comprising: acquiring at least two types of positioning references based upon a positioning service request from a user, the positioning references including Wireless Fidelity (WIFI) information and Global Positioning System (GPS) information, the WIFI information indicating coordinates of a WIFI access point providing services to the mobile terminal, the coordinates of the WIFI access point being used as positioning information of the mobile terminal;

establishing correlation relationships among the positioning references based on the acquired positioning references; and performing integrated positioning and cross-validation on a precise location of the user based on the correlation relationships among the positioning references to determine final positioning service information, wherein the cross-validation further includes:

when a distance between coordinates of the WIFI information and coordinates of the GPS information exceeds an accuracy range of the WIFI information, replacing coordinates of the WIFI information with new coordinates based on the GPS coordinates;

wherein:

the positioning references further include base station information, the base station information indicating coordinates of a base station in a mobile phone network providing services to the mobile terminal, the coordinates of the base station being used as positioning information of the mobile terminal; and performing integrated positioning further includes:

when the at least two types of positioning references are acquired simultaneously, determining the precise location of the user by using:

the GPS information, when the acquired at least two types of positioning references include the GPS information; or the WIFI information, when the acquired at least two types of positioning references do not include the GPS information; and when multiple base stations information or WIFI information is acquired simultaneously, using a center point of multiple position coordinates of the multiple base stations information as the base station information, or using a center point of multiple position coordinates of the multiple WIFI information as the WIFI information.

14. The mobile terminal according to claim 13, wherein:

the positioning references further include base station information, the base station information indicating coordinates of a base station in a mobile phone network providing services to the mobile terminal, the coordinates of the base station being used as positioning information of the mobile terminal; and the integrated positioning further includes:

when the at least two types of positioning references are acquired simultaneously, determining the precise location of the user by using:

the GPS information, when the acquired at least two types of positioning references include the GPS information; or the WIFI information, when the acquired at least two types of positioning references do not include the GPS information; and when multiple base stations information or WIFI information is acquired simultaneously, using a center point of multiple position coordinates of the multiple base stations information as the base station information, or using a center point of multiple position coordinates of the multiple WIFI information as the WIFI information; and the cross-validation further includes: correcting the WIFI information based on WIFI adjacent relationships.

15. The mobile terminal according to claim 14, wherein, after determining the final positioning service information, the computer programs cause the mobile terminal to perform:

accepting error correction of the final positioning service information from the user; and based on the user's mobile phone model, pushing information of a nearby business entity.

16. The mobile terminal according to claim 13, wherein the computer programs cause the mobile terminal to perform:

when the distance between coordinates of the WIFI information and coordinates of the GPS information exceeds about 100 meters, replacing coordinates of the WIFI information with new coordinates based on the GPS coordinates.

17. The method according to claim 1, further including:

providing the user with a location description of the base station, the location description including a place name having the most votes from a plurality of users during a time period when a user of the plurality of users votes by:

inputting a place name for a current position the user is located at within the coverage area of the base station; or choosing a place name voted by other users for the base station.

18. The mobile terminal according to claim 14, wherein the computer programs cause the mobile terminal to perform:

providing the user with a location description of the base station, the location description including a place name having the most votes from a plurality of users during a time period when a user of the plurality of users votes by:

inputting a place name for a current position the user is located at within the coverage area of the base station; or choosing a place name voted by other users for the base station.

\* \* \* \* \*